United States Patent [19]

Yamaguchi

[11] Patent Number: 5,060,932
[45] Date of Patent: Oct. 29, 1991

[54] AMUSEMENT APPARATUS HAVING ROTARY CAPSULE

[75] Inventor: Saburo Yamaguchi, Tokyo, Japan

[73] Assignees: Nisshinbo Techno Vehicle Inc.; NKK Corporation, Tokyo, Japan

[21] Appl. No.: 509,596

[22] Filed: Apr. 13, 1990

[30] Foreign Application Priority Data

May 25, 1989 [JP] Japan .................................. 1-132459
May 31, 1989 [JP] Japan .................................. 1-138527

[51] Int. Cl.$^5$ ............................................. A63G 31/14
[52] U.S. Cl. .................................... 272/36; 272/33 R; 434/34; 434/43; 434/45; 434/58
[58] Field of Search .................... 272/33 R, 36, 49, 50; 434/34, 43, 45, 58, 44, 46, 55, 56, 57, 62, 69

[56] References Cited

U.S. PATENT DOCUMENTS

| | | | |
|---|---|---|---|
| 1,342,871 | 8/1920 | Ruggles | 272/36 X |
| 1,896,175 | 2/1933 | Huffman | 272/36 X |
| 2,780,460 | 2/1957 | Eyerly | 272/36 |
| 3,135,057 | 6/1964 | Nelson et al. | 272/36 X |
| 4,824,099 | 4/1989 | Rusu et al. | 272/36 X |
| 4,856,771 | 8/1989 | Nelson et al. | 272/36 X |

Primary Examiner—Richard E. Chilcot, Jr.
Attorney, Agent, or Firm—Frishauf, Holtz, Goodman & Woodward

[57] ABSTRACT

An amusement apparatus having a rotary capsule, which comprises: a capsule having therein a seat, provided with a player restraining means; an inner frame arranged outside the capsule, for rotatably supporting the capsule through a first shaft; an intermediate frame arranged outside the inner frame, for rotatably supporting the inner frame through a second shaft extending in a direction different from that of the first shaft; and an outer frame arranged outside the intermediate frame, for rotatably supporting the intermediate frame through a third shaft extending in a direction different from those of the first shaft and the second shaft. The capsule, the inner frame and the intermediate frame rotate independently and selectively by the action of respective driving means.

13 Claims, 7 Drawing Sheets

AMUSEMENT APPARATUS HAVING ROTARY CAPSULE

As far as I know, there is available the following prior art document pertinent to the present invention:
Japanese Utility Model Provisional Publication No. 64-56,292 dated Apr. 7, 1989.

The contents of the prior art disclosed in the above-mentioned prior art document will be discussed hereafter under the heading of the "BACKGROUND OF THE INVENTION".

FIELD OF THE INVENTION

The present invention relates to an amusement apparatus having a rotary capsule which a player gets on.

BACKGROUND OF THE INVENTION

An amusement land is now provided with various kinds of amusement apparatus having rotary capsules which players get on.

In almost all amusement apparatuses having such rotary capsules, however, the capsule rotates only in a single direction. Because of this simple motion of the capsule, a player who gets on it with an expectation of having a special sensation, becomes soon accustomed to the simple motion of the capsule, and cannot fully enjoy the play. An amusement apparatus having a capsule rotating in a single direction and moving horizontally or vertically has been proposed, but was unable to sufficiently satisfy a player.

Under such circumstances, an amusement apparatus having a capsule which rotates in various directions is disclosed in Japanese Utility Model Provisional Publication No. 64-56,292 dated Apr. 7, 1989 (hereinafter referred to as the "prior art"). The amusement apparatus of the prior art is described below with reference to FIG. 1.

FIG. 1 is a schematic front view illustrating the amusement apparatus having a rotary capsule of the prior art. As shown in FIG. 1, the amusement apparatus 1 of the prior art comprises:
- a drum type rotary capsule 2 having therein a seat 3;
- an inner frame 4 arranged outside the capsule 2;
- an intermediate frame 5 arranged outside the inner frame 4;
- an outer frame 6 arranged outside the intermediate frame 5;
- a first shaft 7, arranged on the center axis of the capsule 2, for rotatably connecting the capsule 2 to the inner frame 4;
- a second shaft 8, the center axis 8a of which perpendicularly intersects the center axis of the first shaft 7, for rotatably connecting the inner frame 4 to the intermediate frame 5;
- a third shaft 9, extending in a direction different from those of the first shaft 7 and the second shaft 8, and the center axis 9a of which intersects diagonally the vertical line 10, for rotatably connecting the intermediate frame 5 to the outer frame 6;
- an intermediate frame driving means 11, provided between the intermediate frame 5 and the outer frame 6, for rotating the intermediate frame 5 around the third shaft 9 relative to the outer frame 6;
- a capsule braking means 12, provided between the capsule 2 and the inner frame 4, for braking the rotation of the capsule 2 relative to the inner frame 4; and
- an inner frame braking means 13, provided between the inner frame 4 and the intermediate frame 5, for braking the rotation of the inner frame 4 relative to the intermediate frame 5.

Upon starting up the above-mentioned apparatus 1 of the prior art, the center of gravity of the capsule 2 is lower than the first shaft 7 on the vertical line 10 passing through the center axis of the first shaft 7.

The intermediate frame 5 is rotated around the third shaft 9 relative to the outer frame 6 by means of the intermediate frame driving means 11 comprising a motor and a reduction gear set.

As described above, the center axis 9a of the third shaft 9 diagonally intersects the vertical line 10, and upon starting up the amusement apparatus 1, the center of gravity of the capsule 2 is located, not on the center axis 9a of the third shaft 9, but on the vertical line 10 passing through the center axis of the first shaft 7. Therefore, when the intermediate frame 5 is rotated around the third shaft 9 by means of the intermediate frame driving means 11, a force causing the inner frame 4 to rotate around the second shaft 8 is produced under the effect of the transfer of the center of gravity of the capsule 2 along with the rotation of the intermediate frame 5. As a result, the inner frame 4 rotates around the second shaft 8 relative to the intermediate frame 5 along with the rotation of the intermediate frame 5 around the third shaft 9. This rotation of the inner frame 4 relative to the intermediate frame 5 is braked by means of the inner frame braking means 13 comprising an electromagnetic brake.

Along with the rotation of the intermediate frame 5 around the third shaft 9 and the rotation of the inner frame 4 around the second shaft 8, the center of gravity of the capsule 2 transfers around the first shaft 7, i.e., the capsule 2 rotates around the first shaft 7. This rotation of the capsule 2 relative to the inner frame 4 is braked by means of the capsule braking means 12 comprising an electromagnetic brake.

The above-mentioned amusement apparatus of the prior art has the following advantages: (1) The intermediate frame 5 rotates around the third shaft 9 relative to the outer frame 6; the inner frame 4 rotates around the second shaft 8 which extends in a direction different from that of the third shaft 9, relative to the intermediate frame 5; and the capsule 2 rotates around the first shaft 7, which extends in a direction different from those of the second shaft 8 and the third shaft 9, relative to the inner frame 4. The capsule 2 thus rotates in various directions relative to the ground, therefore satisfying to some extent a player who gets on the apparatus with an expectation of having a special sensation; and (2) The inner frame 4 and the capsule 2 can be individually rotated only by rotating the intermediate frame 5 around the third shaft 9 by means of the intermediate frame driving means 11. The structure is therefore relatively simple, and the manufacturing cost is relatively low.

In the amusement apparatus 1 of the prior art, however, the force causing the rotation of the inner frame 4 around the second shaft 8 and the force causing the rotation of the capsule 2 around the first shaft 7 are produced by the transfer of the center of gravity of the capsule 2, caused by the rotation of the intermediate frame 5 around the third shaft 9 by means of the intermediate frame driving means 11. The above-mentioned apparatus 1 of the prior art has therefore the following defects:

(a) The rotating direction of the capsule 2 cannot be changed to an arbitrary direction from time to time;

(b) The rotating speed of the capsule 2 cannot be changed to an arbitrary speed from time to time; and (c) The apparatus cannot therefore sufficiently satisfy a player who gets on the apparatus with an expectation of having a special sensation.

Under such circumstances, there is a strong demand for development of an amusement apparatus having a rotary capsule, of which the rotating direction of the capsule can be changed to an arbitrary direction from time to time, and further, the rotating speed of the capsule can be changed to an arbitrary speed from time to time, thus sufficiently satisfying a player who gets on the apparatus with an expectation of having a special sensation, but such an apparatus has not as yet been proposed.

SUMMARY OF THE INVENTION

An object of the present invention is therefore to provide an amusement apparatus having a rotary capsule, of which the rotating direction of the capsule can be changed to an arbitrary direction from time to time, and further, the rotating speed of the capsule can be changed to an arbitrary speed from time to time, thus sufficiently satisfying a player who gets on the apparatus with an expectation of having a special sensation.

In accordance with one of the features of the present invention, there is provided an amusement apparatus having a rotary capsule, which comprises:

a capsule (15) having therein at least one seat (16), each provided with a player restraining means (17);

an inner frame (19) arranged outside said capsule (15);

an intermediate frame (20) arranged outside said inner frame (19);

an outer frame (21) arranged outside said intermediate frame (20);

a first shaft (22) for rotatably connecting said capsule (15) to said inner frame (19);

a second shaft (25) extending in a direction different from that of said first shaft (22), for rotatably connecting said inner frame (19) to said intermediate frame (20);

a third shaft (26) extending in a direction different from those of said first shaft (22) and said second shaft (25), for rotatably connecting said intermediate frame (20) to said outer frame (21);

a capsule driving means (27), provided between said capsule (15) and said inner frame (19), for rotating said capsule (15) around said first shaft (22) relative to said inner frame (19);

an inner frame driving means (28), provided between said inner frame (19) and said intermediate frame (20), for rotating said inner frame (19) around said second shaft (25) relative to said intermediate frame (20); and an intermediate frame driving means (29), provided between said intermediate frame (20) and said outer frame (21), for rotating said intermediate frame (20) around said third shaft (26) relative to said outer frame (21).

DETAILED DESCRIPTION OF PREFERRED EMBODIMENTS

From the above-mentioned point of view, extensive studies were carried out to develop an amusement apparatus having a rotary capsule, of which the rotating direction of the capsule can be changed to an arbitrary direction from time to time, and further, the rotating speed of the capsule can be changed to an arbitrary speed from time to time, thus sufficiently satisfying a player who gets on the apparatus with an expectation of having a special sensation.

As a result, the following findings were obtained: In a rotary amusement apparatus which comprises a capsule having therein at least one seat; an inner frame arranged outside the capsule; an intermediate frame arranged outside the inner frame; an outer frame arranged outside the intermediate frame; a first shaft for rotatably connecting the capsule to the inner frame; a second shaft extending in a direction different from that of the first shaft, for rotatably connecting the inner frame to the intermediate frame; and a third shaft extending in a direction different from those of the first shaft and the second shaft, for rotatably connecting the intermediate frame to the outer frame, it is possible to obtain an amusement apparatus having a rotary capsule, of which the rotating direction of the capsule can be changed to an arbitrary direction from time to time, and further, the rotating speed of the capsule can be changed to an arbitrary speed from time to time, thus sufficiently satisfying a player who gets on the apparatus with an expectation of having a special sensation, by providing, between the capsule and the inner frame, a capsule driving means for rotating the capsule around the first shaft; providing, between the inner frame and the intermediate frame, an inner frame driving means for rotating the inner frame around the second shaft; and providing, between the intermediate frame and the outer frame, an intermediate frame driving means for rotating the intermediate frame around the third shaft.

The present invention was developed on the basis of the above-mentioned findings. Now, a first embodiment of the amusement apparatus having a rotary capsule of the present invention is described below with reference to the drawings.

Figure 1:
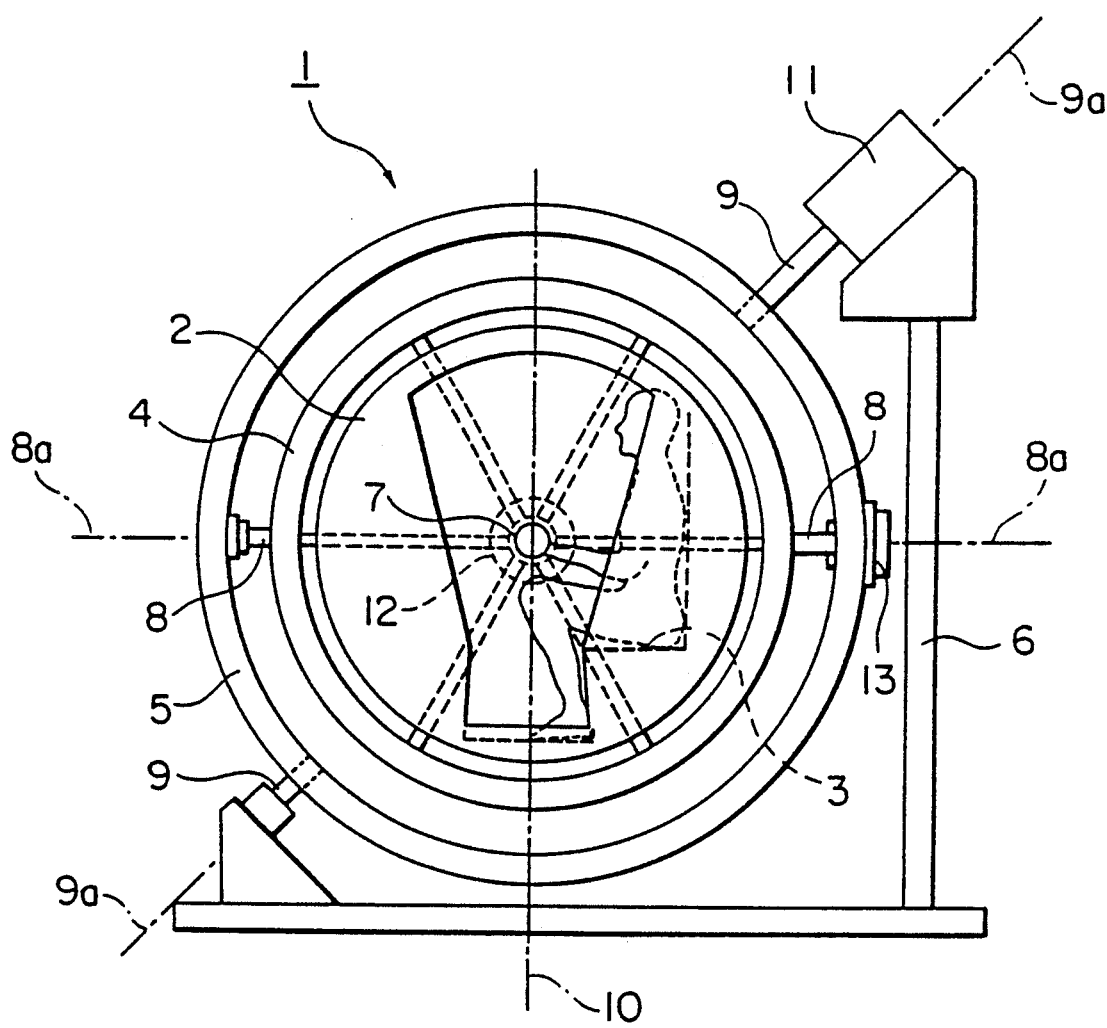
FIG. 1 is a schematic front view illustrating the amusement apparatus having a rotary capsule of the prior art.
Figure 2:
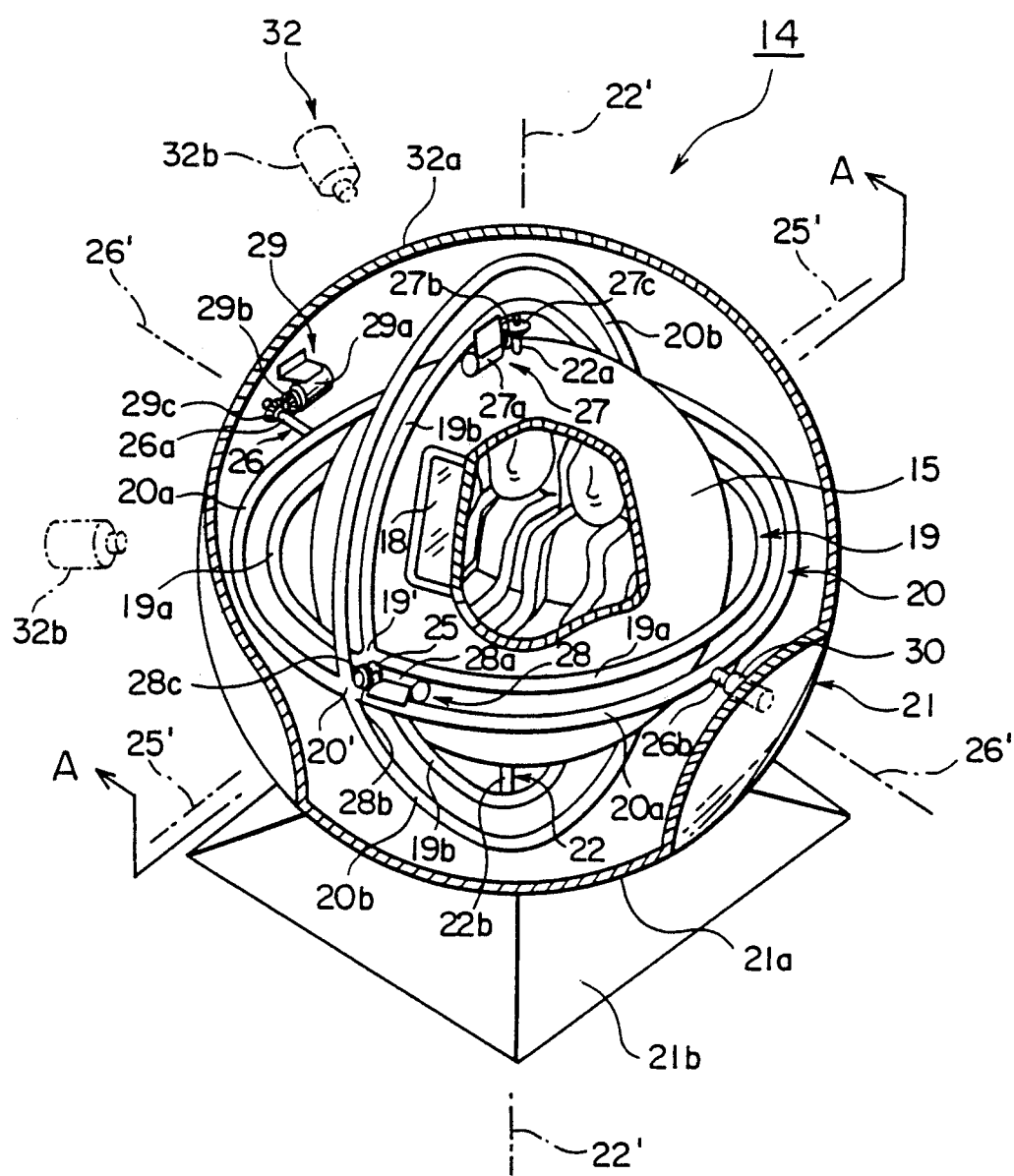
FIG. 2 is a partially cutaway schematic perspective view illustrating a first embodiment of the amusement apparatus having a rotary capsule of the present invention.
Figure 3:
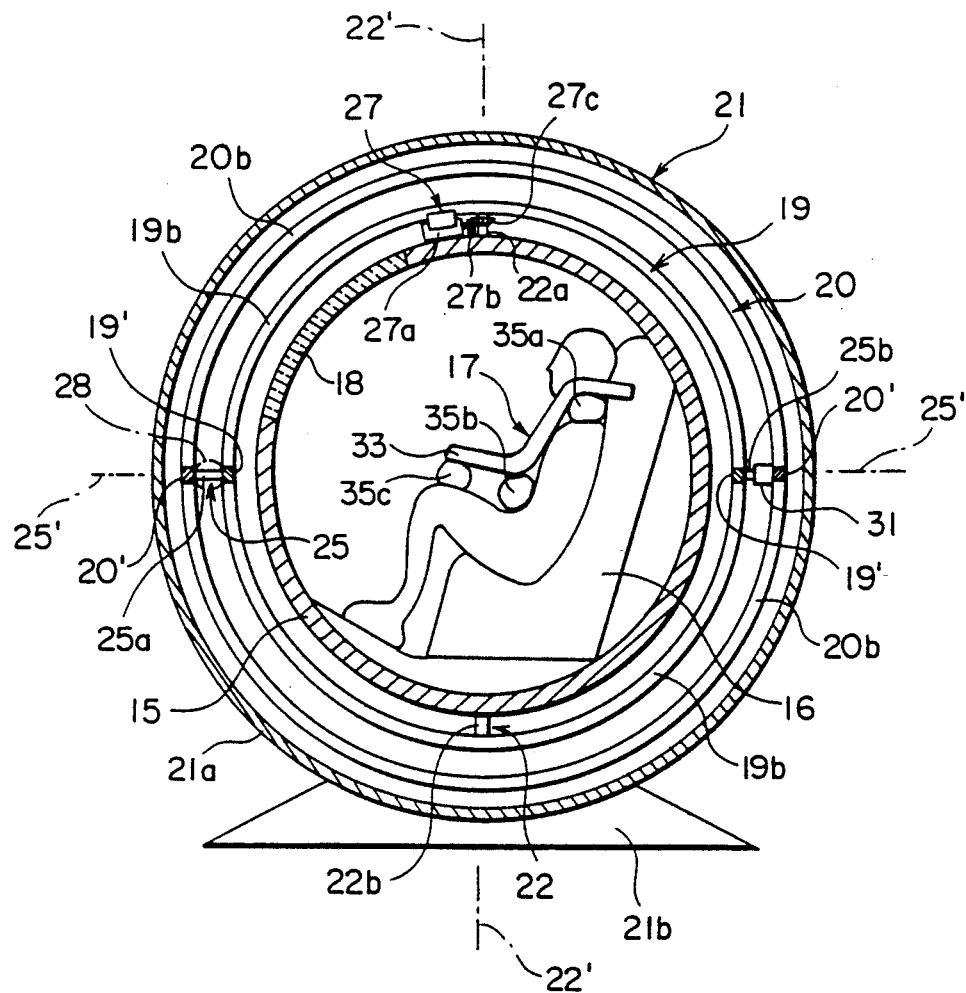
FIG. 3 is a cross-sectional view of FIG. 2 cut along the line A--A.
Figure 4:
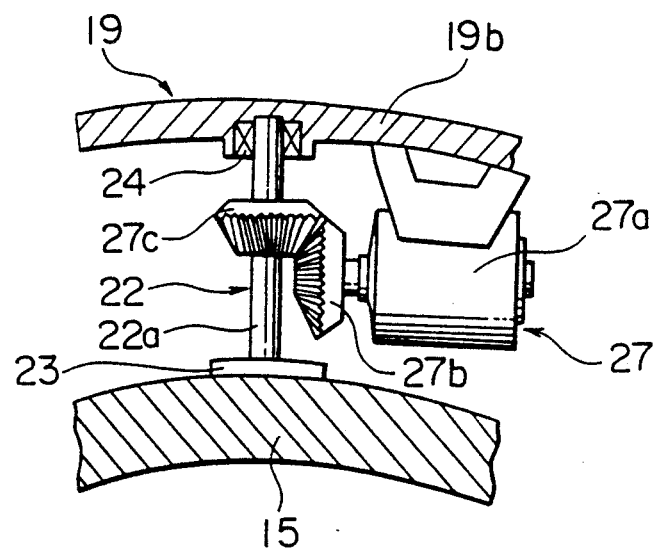
FIG. 4 is an enlarged view illustrating a capsule driving means shown in FIGS. 2 and 3.
Figure 5:
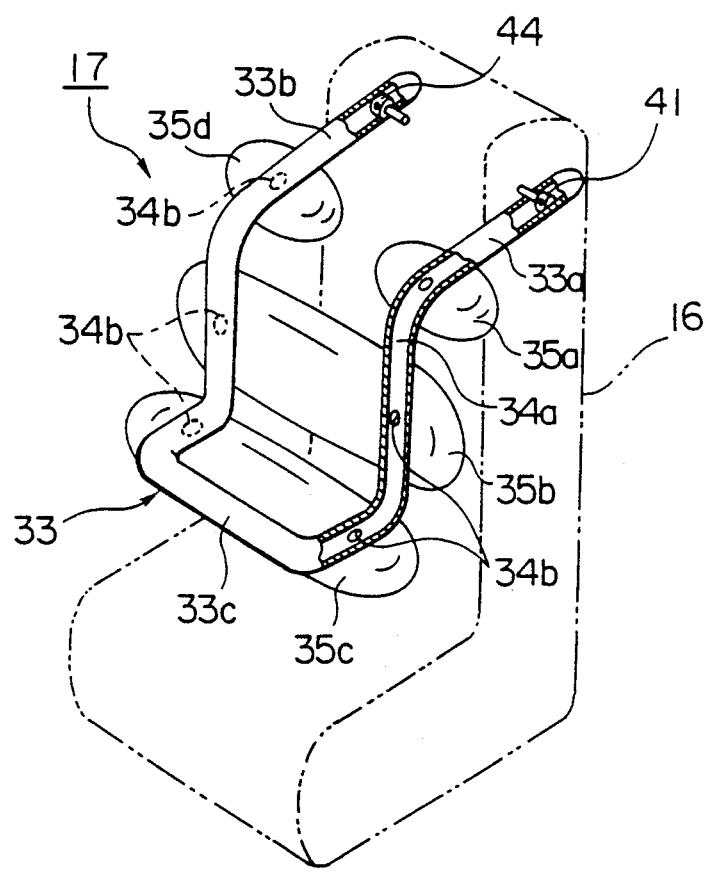
FIG. 5 is a schematic perspective view illustrating a player restraining means in the first embodiment of the amusement apparatus of the present invention.
Figure 6:
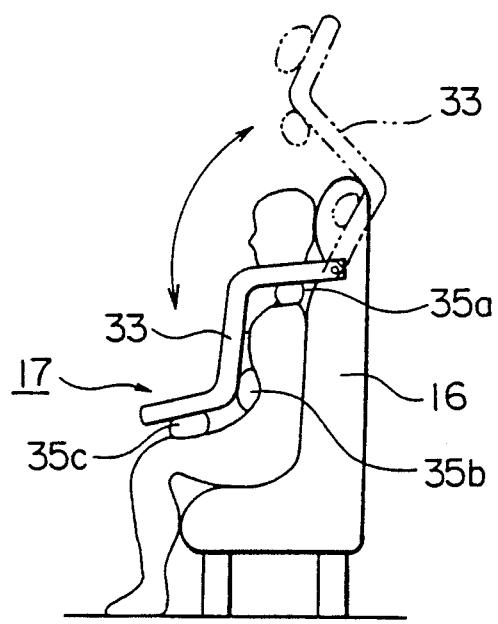
FIG. 6 is a schematic side view illustrating the player restraining means shown in FIG. 5 in service.
Figure 7:
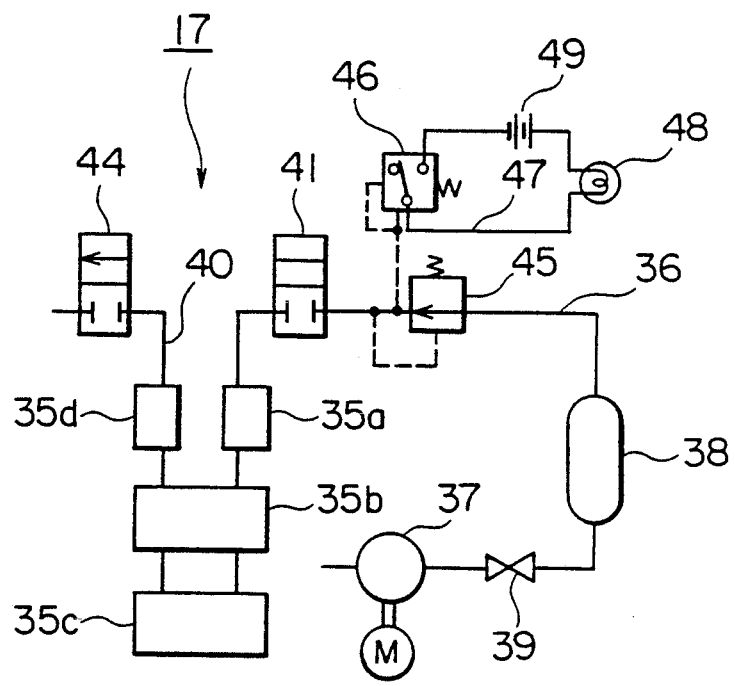
FIG. 7 is a block diagram illustrating a compressed-air circuit for the player restraining means shown in FIG. 5.
Figure 8:
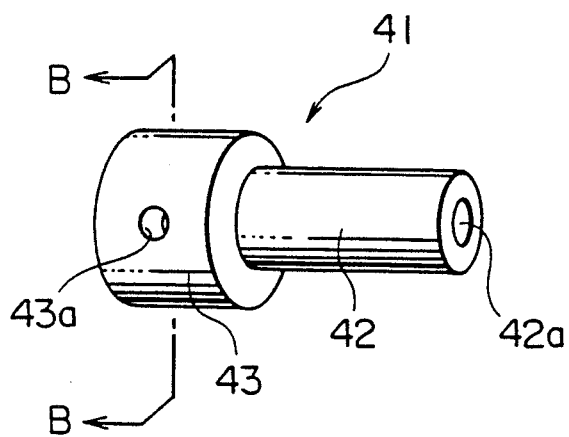
FIG. 8 is a perspective view illustrating a compressed-air supply valve for the player restraining means shown in FIG. 5.
Figure 9:
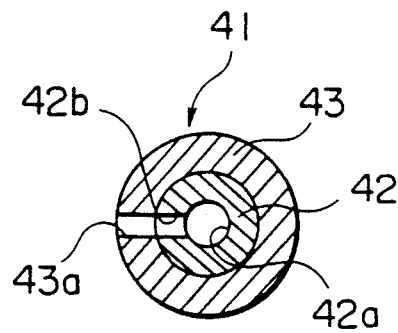
FIG. 9 is a cross-sectional view of FIG. 8 cut along the line B—B.

FIG. 2 is a partially cutaway schematic perspective view illustrating the first embodiment of the amusement apparatus having a rotary capsule of the present invention; FIG. 3 is a cross-sectional view of FIG. 2 cut along the line A—A; FIG. 4 is an enlarged view illustrating a capsule driving means shown in FIGS. 2 and 3; FIG. 5 is a schematic perspective view illustrating a player restraining means in the first embodiment of the amusement apparatus of the present invention; FIG. 6 is a schematic side view illustrating the player restraining means shown in FIG. 5 in service; FIG. 7 is a block diagram illustrating a compressed-air circuit for the player restraining means shown in FIG. 5; FIG. 8 is a perspective view illustrating a compressed-air supply valve for the player restraining means shown in FIG. 5; and FIG. 9 is a cross-sectional view of FIG. 8 cut along the line B—B.

As shown in FIGS. 2 and 3, the amusement apparatus 14 of the first embodiment of the present invention comprises a capsule 15, an inner frame 19 arranged outside the capsule 15, an intermediate frame 20 arranged outside the inner frame 19, an outer frame 21 arranged outside the intermediate frame 20, a first shaft 22 for rotatably connecting the capsule 15 to the inner frame 19, a second shaft 25 for rotatably connecting the inner frame 19 to the intermediate frame 20, a third shaft 26 for rotatably connecting the intermediate frame 20 to the outer frame 21, a capsule driving means 27, an inner frame driving means 28, and an intermediate frame driving means 29.

The capsule 15 is formed of an opaque plastics into a hollow sphere, and is provided with an entry port (not shown) having a door. A pair of seats 16 each having a player restraining means 17 described layer are provided in the capsule 15. In addition, a window 18 having a transparent and impact-resistant glass or plastic plate is formed in a portion of the capsule 15 opposite to the pair of seats 16. The capsule 15 is reinforced with steel bars and steel sheets as required.

The inner frame 19 comprises a pair of round rings 19a and 19b having the same inside diameter larger than the outside diameter of the capsule 15. Each of the pair of rings 19a and 19b is formed by bending a steel bar or a steel pipe into an annular shape and welding together the both ends thereof. The pair of rings 19a and 19b are joined together by welding or the like at two connecting points 19' on the both ends of a diameter common to the pair of rings 19a and 19b so that they intersect each other at right angles at the above-mentioned respective connecting points 19'.

The inner frame 20 comprises a pair of round rings 20a and 20b having the same inside diameter larger than the outside diameter of the inner frame 19. Each of the pair of rings 20a and 20b is formed by bending a steel bar or a steel pipe into an annular shape and welding together the both ends thereof. The pair of rings 20a and 20b are joined together by welding or the like at two connecting points 20' on the both ends of a diameter common to the pair of rings 20a and 20b so that they intersect each other at right angles at the above-mentioned respective connecting points 20'.

The outer frame 21 comprises a spherical shell 21a made of a semi-transparent plastics having an inside diameter larger than the outside diameter of the intermediate frame 20, which spherical shell covers the intermediate frame 20, and a pedestal 21b fixed to the lower portion of the spherical shell 21a. The spherical shell 21a of the outer frame 21 is also provided with an entry port (not shown) having a door, as in the above-mentioned capsule 15. The spherical shell 21a is also reinforced with steel bars and steel sheets as required, as in the case of the capsule 15.

Since the spherical shell 21a of the outer frame 21 is made of a semi-transparent plastics, the spherical shell 21a serves as a screen 32a for receiving an image projected from a projector 32b as described later.

The first shaft 22 for rotatably connecting the capsule 15 to the inner frame 19 comprises a pair of short shafts 22a and 22b arranged on the same axial line. The center axis 22' of the first shaft 22 passes through the center of the capsule 15. Each of the pair of short shafts 22a and 22b as the first shaft 22 has a flange 23 at one end thereof (refer to FIG. 4). The flanges 23 are fixed by welding or by bolt connection to the top and the bottom of the capsule 15, respectively. The other ends of the pair of short shafts 22a and 22b are rotatably fitted to the other ring 19b of the pair of rings 19a and 19b of the inner frame 19 through respective bearings 24. The capsule 15 is thus rotatable around the center axis 22' of the first shaft 22 relative to the inner frame 19.

The second shaft 25 for rotatably connecting the inner frame 19 to the intermediate frame 20 comprises a pair of short shafts 25a and 25b arranged on the same axial line. The center axis 25' of the second shaft 25 intersects the center axis 22' of the first shaft 22 at the center of the capsule 15. Each of the pair of short shafts 25a and 25b as the second shaft 25 has a flange (not shown) at one end thereof. The flanges are fixed by welding or by bolt connection to the above-mentioned two connecting points 19' of the inner frame 19, respectively. The other ends of the pair of short shafts 25a and 25b are rotatably fitted to the above-mentioned two connecting points 20' of the intermediate frame 20 through respective bearings (not shown). The inner frame 19 is thus rotatable around the center axis 25' of the second shaft 25 relative to the intermediate frame 20.

The third shaft 26 for rotatably connecting the intermediate frame 20 to the outer frame 21 comprises a pair of short shafts 26a and 26b arranged on the same horizontal straight line. Upon starting up the amusement apparatus 14, the center axis 26' of the third shaft 26 intersects the center axis 22' of the first shaft 22 and the center axis 25' of the second shaft 25 at right angles at the center of the capsule 15. Each of the pair of short shafts 26a and 26b as the third shaft 26 has a flange (not shown) at one end thereof. The flanges are fixed by welding or by bolt connection to the one ring 20a of the pair of rings 20a and 20b of the intermediate frame 20, respectively, at the both ends of the diameter of the one ring 20a, which diameter intersects another diameter of the one ring 20a passing through the two connecting points 20' of the pair of rings 20a and 20b at right angles. The other ends of the pair of short shafts 26a and 26b are rotatably fitted to the outer frame 21 through respective bearings (not shown). The intermediate frame 20 is thus rotatable around the center axis 26' of the third shaft 26 relative to the outer frame 21.

As has been described above, upon starting up the amusement apparatus 14, the respective center axes 22', 25' and 26' of the first shaft 22, the second shaft 25 and the third shaft 26 intersect each other at right angles at a point, i.e., at the center of the capsule 15, and the third shaft 26 extends horizontally.

The capsule driving means 27 comprises a motor 27a having a reduction gear set (not shown), which is fitted to the other ring 19b of the inner frame 19 near the one short shaft 22a of the pair of short shafts 22a and 22b as the first shaft 22, a bevel gear 27b fitted to the output shaft of the motor 27a, and another bevel gear 27c fitted to the one short shaft 22a and engaging with the bevel gear 27b. The number of rotations of the capsule 15 relative to the inner frame 19 can be changed in response to the extent of voltage applied to the motor 27a provided with the reduction gear set. More specifically, by increasing voltage applied to the motor 27a, the number of rotations of the capsule 15 relative to the inner frame 19 increases, and by decreasing voltage applied to the motor 27a, the number of rotations of the capsule 15 relative to the inner frame 19 decreases. The rotating direction of the motor 27a can be changed by the action of a change-over switch (not shown).

The inner frame driving means 28 has components identical with those of the above-mentioned capsule driving means 27. More particularly, the inner frame driving means 28 comprises a motor 28a having a reduction gear set (not shown), which is fitted to the one ring 20a of the intermediate frame 20 near the one short shaft 25a of the pair of short shafts 25a and 25b as the second shaft 25, a bevel gear 28b fitted to the output shaft of the motor 28a, and another bevel gear 28c fitted to the one short shaft 25a and engaging with the bevel gear 28b. The number of rotations of the inner frame 19 relative to the intermediate frame 20 can be changed in response to the extent of voltage applied to the motor 28a provided with the reduction gear set. More specifically, by increasing voltage applied to the motor 28a, the number of rotations of the inner frame 19 relative to the intermediate frame 20 increases, and by decreasing voltage applied to the motor 28a, the number of rotations of the inner frame 19 relative to the intermediate frame 20 decreases. The rotating direction of the motor 28a can be changed by the action of a change-over switch (not shown).

The intermediate frame driving means 29 has components identical with those of the above-mentioned capsule driving means 27. More particularly, the intermediate frame driving means 29 comprises a motor 29a having a reduction gear set (not shown), which is fitted to the outer frame 21 near the one short shaft 26a of the pair of short shafts 26a and 26b as the third shaft 26, a bevel gear 29b fitted to the output shaft of the motor 29a, and another bevel gear 29c fitted to the one short shaft 26a and engaging with the bevel gear 29b. The number of rotations of the intermediate frame 20 relative to the outer frame 21 can be changed in response to the extent of voltage applied to the motor 29a provided with the reduction gear set. More specifically, by increasing voltage applied to the motor 29a, the number of rotations of the intermediate frame 20 relative to the outer frame 21 increases, and by decreasing voltage applied to the motor 29a, the number of rotations of the intermediate frame 20 relative to the outer frame 21 decreases. The rotating direction of the motor 29a can be changed by the action of a change-over switch (not shown).

The motor 29a of the intermediate frame driving means 29 is connected by means of a conductor to a power source (not shown) arranged outside the outer frame 21.

The motor 28a of the inner frame driving means 28 and the motor 27a of the capsule driving means 27 are connected to the above-mentioned power source as follows:

More particularly, a first connector 30 for enabling to connect the respective motors 28a and 27a of the inner frame driving means 28 and the capsule driving means 27, irrespective of the rotation of the inner frame 19 relative to the intermediate frame 20 and irrespective of the rotation of the intermediate frame 20 relative to the outer frame 21, to the above-mentioned power source arranged outside the outer frame 21, is fitted to the other short shaft 26b not provided with the intermediate frame driving means 29, of the pair of short shaft 26a and 26b as the third shaft 26. The first connector 30 comprises a plurality of slip rings (not shown) arranged at prescribed intervals around the other short shaft 26b in the axial direction thereof, and a plurality of brushes (not shown) provided on the outer frame 21 so as to be in contact with the plurality of respective slip rings. The plurality of slip rings comprise a plurality of slip rings for the inner frame driving means 28 and a plurality of slip rings for the capsule driving means 27. The plurality of brushes comprise a plurality of brushes for the inner frame driving means 28 and a plurality of brushes for the capsule driving means 27. Since the above-mentioned first connector 30 is a conventional one, a detailed description thereof is omitted here.

The motor 28a of the inner frame driving means 28 is connected to the plurality of slip rings of the first connector 30 for the inner frame driving means 28 through a conductor wired along the one ring 20a of the intermediate frame 20, and the plurality of brushes of the first connector 30 for the inner frame driving means 28 are connected to the above-mentioned power source through a connector.

In addition, a second connector 31 for enabling to connect the motor 27a of the capsule driving means 27, irrespective of the rotation of the inner frame 19 relative to the intermediate frame 20, to the plurality of slip rings of the first connector 30 for the capsule driving means 27, is fitted to the other short shaft 25b not provided with the inner frame driving means 28, of the pair of short shafts 25a and 25b as the second shaft 25. The second connector 31 comprises a plurality of slip rings (not shown) arranged at prescribed intervals around the other short shaft 25b in the axial direction thereof, and a plurality of brushes (not shown) provided on the intermediate frame 20 so as to be in contact with the plurality of respective slip rings. Since the above-mentioned second connector 31 is also a conventional one, a detailed description thereof is omitted here.

The motor 27a of the capsule driving means 27 is connected to the plurality of slip rings of the second connector 31 through a conductor wired along the other ring 19b of the inner frame 19, and the plurality of brushes of the second connector 31 are connected to the plurality of slip rings of the above-mentioned first connector 30 for the capsule driving means 27 through a conductor wired along the one ring 20a of the intermediate frame 20. The plurality of brushes of the first connector 30 for the inner frame driving means 28 are connected to the above-mentioned power source through a connector.

The motor 27a of the capsule driving means 27, the motor 28a of the inner frame driving means 28 and the motor 29a of the intermediate frame driving means 29 are connected respectively to a controller (not shown), into which a prescribed program is inputted. Therefore, the motor 27a of the capsule driving means 27, the motor 28a of the inner frame driving means 28 and the motor 29a of the intermediate frame driving means 29 are independently and selectively driven in accordance with the prescribed program inputted into the controller.

The amusement apparatus 14 of the above-mentioned first embodiment of the present invention has an image display means 32. The image display means 32 comprises, as shown in FIG. 2, the above-mentioned spherical shell 21a made of a semi-transparent plastics of the outer frame 21, which serves as a screen 32a, and a plurality of projectors 32b for projecting an image onto the outer surface of the spherical shell 21a as the screen 32a, arranged outside the outer frame 21.

As shown in FIGS. 5 to 7, the seat 16 provided in the capsule 15 of the amusement apparatus 14 of the first embodiment of the present invention has a player restraining means 17. The player restraining means 17 comprises a holder 33 provided movably between a player restraining position and a player releasing position, a holder driving means, a holder locking/releasing means, a plurality of air bags 35a, 35b, 35c and 35d attached to the holder 33, a compressed-air supply pipe 36, one end of which is connected to the air bags 35a, 35b, 35c and 35d, and the other end of which is connected to an air compressor 37 as a compressed-air source, a compressed-air discharge pipe 40, one end of which is connected to the air bags 35a, 35b, 35c and 35d, and the other end of which is opened to the open air, a compressed-air supply valve 41 provided in the compressed-air supply pipe 36, and a compressed-air discharge valve 44 provided in the compressed-air discharge pipe 40.

The holder 33 is formed by bending a steel pipe or a synthetic resin pipe as shown in FIG. 5, and closing the both ends thereof with plugs (not shown). The holder 33 has therein a path 34a for supplying a compressed air to the air bags 35a, 35b, 35c and 35d. The holder 33 is fitted to the seat 16 so as to be movable between the player restraining position and the player releasing position by means of the compressed-air supply valve 41 and the compressed-air discharge valve 44.

The holder driving means (not shown) causes the holder 33 to move between the player restraining position and the player releasing position. The holder driving means comprises an oil pump, a motor for driving the oil pump, a double-acting hydraulic cylinder connected through a pipe to the oil pump, and a solenoid valve provided in the pipe. One end portion of the hydraulic cylinder, i.e., one end portion of the cylinder tube is rotatably fitted to the seat 16. The other end portion of the hydraulic cylinder, i.e., one end portion of the piston rod is rotatably fitted to the holder 33. The solenoid valve has a first port connected to one cylinder chamber of the hydraulic cylinder, a second port connected to the other cylinder chamber of the hydraulic cylinder, a third port connected to the oil pump, and a fourth port connected to an oil reservoir, and selectively operates as follows: (1) causing the first port to communicate with the third port and causing the second port to communicate with the fourth port, to drive the hydraulic cylinder and thus to cause the holder 33 to move from the player restraining position to the player releasing position; (2) causing the first port to communicate with the fourth port and causing the second port to communicate with the third port to drive the hydraulic cylinder and thus to cause the holder 33 to move from the player releasing position to the player restraining position; or (3) shutting off the first port and the second port and causing the third port to communicate with the fourth port to discontinue driving of the hydraulic cylinder and thus to cause the holder 33 to lock. The above-mentioned operations (1) and (2) of the solenoid valve are accomplished by the action of a switch provided near the seat 16 in the capsule 15, and the above-mentioned operation (3) of the solenoid valve is automatically accomplished through a limit switch as the holder locking/releasing means (not shown).

The motor and the solenoid valve of the above-mentioned holder driving means are connected to the power source (not shown) arranged outside the outer frame 21, as in the case of the above-mentioned capsule driving means 27 and the inner frame driving means 28.

The holder locking/releasing means (not shown) locks the holder 33 at the player restraining position, and releases the holder 33 from the player locking position. The holder locking/releasing means comprises the solenoid valve of the above-mentioned holder driving means, and the limit switch connected to the solenoid valve. In other words, the solenoid valve of the holder driving means serves also as a part of the components of the holder locking/releasing means. The limit switch is fitted to the seat 16 so that the switch is turned on in contact with part of the holder 33 when the holder 33 is at the player restraining position. Therefore, when the holder 33 is moved by means of the holder driving means from the player releasing position to the player restraining position, the limit switch is turned on, whereby the solenoid valve actuates, i.e., the solenoid valve shuts off the first port and the second port of the solenoid valve, and causes the third port to communicate with the fourth port, as described above regarding the holder driving means, thus causing stoppage of driving of the hydraulic cylinder to lock the holder 33 at the player restraining position.

The plurality of air bags 35a, 35b, 35c and 35d are made of a synthetic rubber or a synthetic resin. The plurality of air bags 35a, 35b, 35c and 35d are fitted to the holder 33 so that, when the holder 33 is at the player restraining position, a player sitting on the seat 16 is pressed against the seat 16. A plurality of holes 34b are formed on portions of the holder 33 to which the plurality of air bags 35a, 35b, 35c and 35d are fitted, and the plurality of air bags 35a, 35b, 35c and 35d communicate through these holes 34b to the path 34a in the holder 33. Therefore, a middle portion 33c of the holder 33 having the above-mentioned holes 34b other than one end portion 33a and the other end portion 33b of the holder 33, serves as a liaison pipe for mutual communication between the plurality of air bags 35a, 35b, 35c and 35d. The one end portion 33a of the holder 33 serves as part of the compressed-air supply pipe 36, and the other end portion 33b of the holder 33 serves as part of the compressed-air discharge pipe 40.

As shown in FIGS. 5 and 7, one end of the compressed-air supply pipe 36 including the one end portion 33a of the holder 33 is connected to the air bag 35a, and the other end thereof is connected to the air compressor 37 provided with a motor as the compressed-air source. The air compressor 37 is mounted on the capsule 15. Therefore, the motor of the air compressor 37 is connected to the power source (not shown) arranged outside the outer frame 21, as in the case of the above-mentioned capsule driving means 27 and the inner frame driving means 28.

The compressed-air supply pipe 36 is provided with a compressed-air reservoir 38, and a portion of the compressed-air supply pipe 36 between the air compressor 37 and the compressed-air reservoir 38 is provided with a cock 39. A portion of the compressed-air supply pipe 36 between the air bag 35a and the compressed-air reservoir 38 is provided with the compressed-air supply valve 41, and a portion of the compressed-air supply pipe 36 between the compressed-air supply valve 41 and the compressed-air reservoir 38 is provided with a pressure control valve 45 described later.

As shown in FIGS. 5 and 7, one end of the compressed-air discharge pipe 40 including the other end portion 33b of the holder 33 is connected to the air bag 35d, and the other end thereof is opened to the open air. The compressed-air discharge pipe 40 is provided with the compressed-air discharge valve 44.

As shown in FIGS. 5 and 7 to 9, a rotary spool type two-port change-over valve is used as the compressed-air supply valve 41. More particularly, the compressed-air supply valve 41 comprises a fixed spool 42 and a rotary sleeve 43 rotatably engaging with the outer peripheral surface of one end portion of the fixed spool 42.

The fixed spool 42 has an inner bore 42a along the center axis thereof, and the inner bore 42a is open at one end of the fixed spool 42. The fixed spool 42 also has a port 42b communicating with the inner bore 42a at the other end portion thereof.

The rotary sleeve 43 has a port 43a which communicates with the port 42b of the fixed spool 42 when the rotary sleeve 43 is at a prescribed position relative to the fixed spool 42 (refer to FIG. 9).

Since the compressed-air discharge valve 44 has components identical with those of the above-mentioned compressed-air supply valve 41, a detailed description thereof is omitted.

The holder 33 is fitted to the seat 16 movably between the player restraining position and the player releasing position by means of the above-mentioned compressed-air supply valve 41 and the compressed-air discharge valve 44.

More particularly, the respective fixed spools 42 of the compressed-air supply valve 41 and the compressed-air discharge valve 44 are fixed to the seat 16 so that the center axes thereof are on the same straight line, and the respective rotary sleeves 43 of the compressed-air supply valve 41 and the compressed-air discharge valve 44 are housed in the one end portion 33a of the holder 33 and in the other end portion 33b thereof and secured to the holder 33 so that the ports 43a of the respective rotary sleeves 43 communicate with the path 34a in the holder 33.

Therefore, the holder 33 is movable around the center axes of the respective fixed spools 42 of the compressed-air supply valve 41 and the compressed-air discharge valve 44 between the player restraining position and the player releasing position. Along with this movement of the holder 33, the respective rotary sleeves 43 of the compressed-air supply valve 41 and the compressed-air discharge valve 44 rotate relative to the fixed spools 42 of the compressed-air supply valve 41 and the compressed-air discharge valve 44.

When the holder 33 is at the player restraining position, the port 43a of the rotary sleeve 43 of the compressed-air supply valve 41 communicates with the port 42b of the fixed spool 42 thereof, whereas the communication is shut off between the port of the rotary sleeve of the compressed-air discharge valve 44 and the port of the fixed spool thereof.

When the holder 33 is at the player releasing position, the communication is shut off between the port 43a of the rotary sleeve 43 of the compressed-air supply valve 41 and the port 42b of the fixed spool 42 thereof, whereas the port of the rotary sleeve of the compressed-air discharge valve 44 communicates with the port of the fixed spool thereof.

More specifically, when the holder 33 is at the player restraining position, the compressed-air supply valve 41 is opened whereas the compressed-air discharge valve 44 is closed. When the holder 33 is at the player releasing position, the compressed-air supply valve 41 is closed whereas the compressed-air discharge valve 44 is opened.

The pressure control valve 45 provided in the compressed-air supply pipe 36 between the compressed-air supply valve 41 and the compressed air reservoir 38 comprises a pressure-reducing valve, and keeps constant the pressure of the compressed-air supplied from the air compressor 37 as the compressed-air source through the compressed-air reservoir 38 and the compressed-air supply valve 41 to the plurality of air bags 35a, 35b, 35c and 35d. Since the pressure-reducing valve of this type is a conventional one, a description of the structure thereof is omitted.

Furthermore, a pressure switch 46 is provided in the compressed-air supply pipe 36 between the compressed-air supply valve 41 and the pressure control valve 45. The pressure switch 46 is connected through a conductor 47 to a pilot lamp 48 and a power source 49. The pilot lamp 48 is provided at a position near the seat 16 which permits a player sitting on the seat 16 to visually recognize the lamp. When the pressure of the compressed air in the compressed-air supply pipe 36 between the compressed-air supply valve 41 and the pressure control valve 45 reaches a prescribed pressure, the pressure switch 46 turns on the pilot lamp 48. When the pressure of the compressed air in the compressed-air supply pipe 36 between the compressed-air supply valve 41 and the pressure control valve 45 is under the prescribed pressure, the pressure switch 46 turns off the pilot lamp 48. Since the pressure switch of this type is conventional one, a description of the structure thereof is omitted.

Now, the method for using the amusement apparatus 14 of the above-mentioned first embodiment of the present invention is described.

First, the player enters the spherical shell 21a of the outer frame 21 from the door (not shown) of the spherical shell 21a, then gets on the capsule 15 from the entry port (not shown) provided with the door of the capsule 15, and sits on the seat 16. In this stage, the holder 33 is at the player releasing position.

When the player operates the switch provided near the seat 16, the above-mentioned solenoid valve of the holder driving means is actuated to drive the hydraulic cylinder, whereby the holder 33 moves from the player releasing position to the player restraining position (refer to FIG. 6). Thus, when the holder 33 moves from the player releasing position to the player restraining position, the limit switch of the holder locking/releasing means is turned on, whereby the above-mentioned solenoid valve is actuated to discontinue the driving of the hydraulic cylinder, and as a result, the holder 33 is automatically locked at the player restraining position.

When the holder 33 is at the player restraining position as described above, the compressed-air supply valve 41 is opened and the compressed-air discharge valve 44 is closed. Thus, when the compressed-air supply valve 41 is opened and the compressed-air discharge valve 44 is closed, the compressed air is supplied from the air compressor 37 through the compressed-air supply pipe 36 to the plurality of air bags 35a, 35b, 35c and 35d, whereby the plurality of air bags 35a, 35b, 35c and 35d expand to press the player against the seat 16. The pressure of the compressed air supplied to the plurality of air bags 35a, 35b, 35c and 35d is kept constant by means of the pressure control valve 45. Therefore, the player is securely restrained to the seat 16, irrespective of the player's form of body, under an appropriate pressure, without feeling tightness. When the compressed air is supplied to the plurality of air bags 35a, 35b, 35c and 35d and the pressure thereof reaches a prescribed pressure, the pilot lamp 48 is turned on, whereby the player can confirm that the player restraining means 17 is properly actuated.

Then, the capsule driving means 27, the inner frame driving means 28 and the intermediate frame driving means 29 are driven by means of the controller (not shown) in accordance with the program previously inputted therein. More specifically, the capsule 15 is rotated by means of the capsule driving means 27 around the first shaft 22 in a prescribed direction at a prescribed rotation speed relative to the inner frame 19. The inner frame 19 is rotated by means of the inner frame driving means 28 around the second shaft 25 in a prescribed direction at a prescribed rotation speed relative to the intermediate frame 20. The intermediate frame 20 is rotated by means of the intermediate frame driving means 29 around the third shaft 26 in a prescribed direction at a prescribed rotation speed relative to the outer frame 21. Therefore, the capsule 15 rotates in various directions at various rotation speeds relative to the ground, and during this rotation of the capsule 15, the projectors 32b project dynamic images of the universe or the sea bottom onto the spherical shell 21a of the outer frame 21. As a result, it is possible to give the player a special sensation as if the player were travelling in the universe or on the sea bottom under the zero-gravity conditions. It is needless to mention that, according to the amusement apparatus 14 of the above-mentioned first embodiment of the present invention, the apparatus itself is small-sized and does not require a long travelling rail that a conventional amusement apparatus has required, thus requiring only a small space for installation, this bringing about an economic advantage.

After the lapse of a prescribed period of time, the capsule driving means 27, the inner frame driving means 28 and the intermediate frame driving means 29 stop in accordance with the above-mentioned program previously inputted therein, and the capsule 15 stands still in a state as shown in FIGS. 2 and 3.

Then, the player operates the switch provided near the seat 16 to actuate the solenoid valve of the holder locking/releasing means, commonly used by the holder driving means, thereby releasing the locking of the holder 33 at the player restraining position. When the locking of the holder 33 is released, the hydraulic cylinder as the holder driving means is driven to cause the holder 33 to move from the player restraining position to the player releasing position.

When the holder 33 is at the player releasing position as described above, the compressed-air supply valve 41 is closed and the compressed-air discharge valve 44 is opened. Therefore, the compressed air in the plurality of air bags 35a, 35b, 35c and 35d is discharged to the open air through contraction of these air bags 35a, 35b, 35c and 35d, thus ensuring readiness for the next player.

According to the above description of the amusement apparatus 14 of the first embodiment of the present invention, the motors 27a, 28a and 29a of the capsule driving means 27, the inner frame driving means 28 and the intermediate frame driving means 29 transmit the power thereof through the two bevel gears to the first shaft 22, the second shaft 25 and the third shaft 26, respectively. Without using these bevel gears, however, the output shafts of the motors 27a, 28a and 29a may be used as the first shaft 22, the second shaft 25 and the third shaft 29, respectively. More specifically, the bodies of the motors 27a, 28a and 29a may be fitted to the inner frame 19, the intermediate frame 20 and the outer frame 21, respectively, and the tip portions of the output shafts of these motors may be fitted to the capsule 15, the inner frame 19 and the intermediate frame 20, respectively.

According to the above description of the amusement apparatus 14 of the first embodiment of the present invention, driving of the capsule driving means 27, the inner frame driving means 28 and the intermediate frame driving means 29 is controlled by the controller into which the prescribed program has previously been inputted. Driving of the capsule driving means 27, the inner frame driving means 28 and the intermediate frame driving means 29 may be controlled by providing a control lever operatable by the player in the capsule 15, and allowing the player to operate the control lever.

According to the above description of the amusement apparatus 14 of the first embodiment of the present invention, the holder driving means comprises the oil pump, the motor, the hydraulic cylinder and the solenoid valve. However, the holder driving means may be of any structure in which the holder 33 can be moved between the player restraining position and the player releasing position. A motor, for example, may be used as the holder driving means.

According to the above description of the amusement apparatus 14 of the first embodiment of the present invention, starting of the holder driving means, and locking and releasing of the holder locking/releasing means are accomplished by the player sitting on the seat 16. These operations may however be conducted by an operator outside the amusement apparatus 14.

According to the above description of the amusement apparatus 14 of the first embodiment of the present invention, the image display means 32 provided on the outer frame 21 comprises the screen 32a and the projectors 32b for displaying the dynamic images. However, the image display means 32 may be one which displays still pictures or still photographs.

According to the above description of the amusement apparatus 14 of the first embodiment of the present invention, the pair of rings 19a and 19b of the inner frame 19, and the pair of rings 20a and 20b of the intermediate frame 20 are round in shape. These rings may however be of any shape so far as rotation of the capsule 15, the inner frame 19 and the intermediate frame 20 is not impaired. These rings may be of a rectangular shape, for example.

According to the above description of the amusement apparatus 14 of the first embodiment of the present invention, the respective center axes 22', 25' and 26' of the first shaft 22, the second shaft 25 and the third shaft 26 intersect each other at right angles at the center of the capsule 15 upon starting up the amusement apparatus 14. The positional relationship between the first shaft 22, the second shaft 25 and the third shaft 26 is not however limited to the above, but the center axis 22' of the first shaft 22 may intersect, for example, the center axis 25' of the second shaft 25 at right angles at a point other than the center of the capsule 15.

In the amusement apparatus 14 of the above-mentioned first embodiment of the present invention, furthermore, a shooting game may be played by providing a plurality of targets each comprising an optical sensor on the inner surface of the spherical shell 21a of the outer frame 21, and providing an optical gun in the capsule 15, the player in the capsule 15 shooting the light through the window 18 of the capsule 15 at these targets by means of the optical gun.

Now, a second embodiment of the amusement apparatus having a rotary capsule of the present invention is described below with reference to FIGS. 10 and 11.

Figure 10:
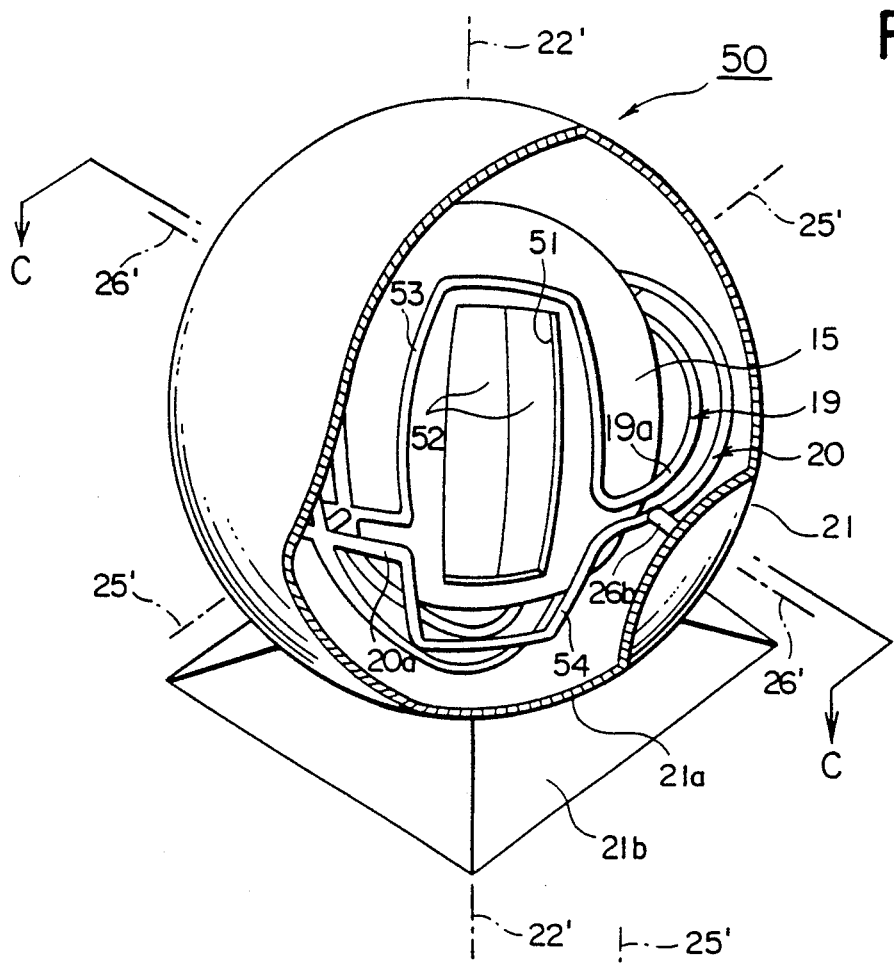
FIG. 10 is a partially cutaway schematic perspective view illustrating a second embodiment of the amusement apparatus having a rotary capsule of the present invention.
Figure 11:
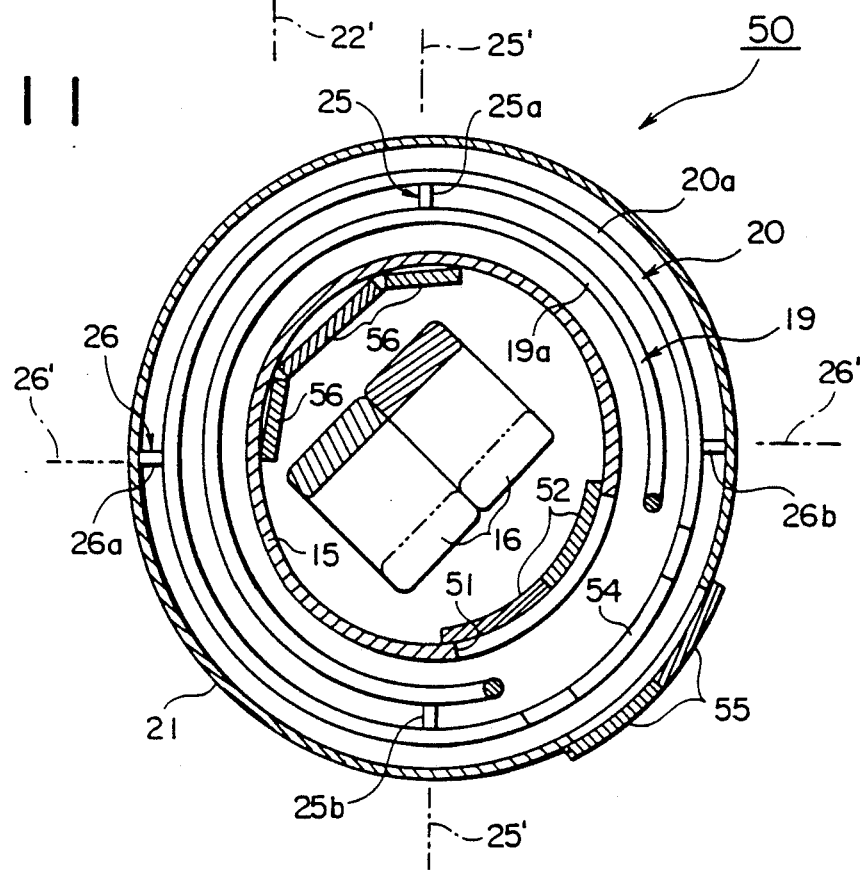
FIG. 11 is a cross-sectional view of FIG. 10 cut along the line C—C.

FIG. 10 is a partially cutaway schematic perspective view illustrating the second embodiment of the amusement apparatus having a rotary capsule of the present invention; and FIG. 11 is a cross-sectional view of FIG. 10 cut along the line C—C.

Since the amusement apparatus 50 of the second embodiment of the present invention is identical with the amusement apparatus 14 of the first embodiment of the present invention except for the following points, the same reference numerals are assigned to the corresponding components, and the description thereof is omitted:

(1) With a view to enabling a player to easily get on the capsule 15 through a door 52 of an entry port 51 of the capsule 15 and a door 55 of the outer frame 21 during a non-operating time of the amusement apparatus 50 of the second embodiment of the present invention, the one ring 19a of the inner frame 19 has an upwardly curved portion 53 which surrounds the top portion of the door 52 of the capsule 15, and the one ring 20a of the intermediate frame 20 has a downwardly curved portion 54 which surrounds the bottom portion of the door 52 of the capsule 15;

(2) The seat 16 is rotatable around the center axis of a strut securing the seat 16 to the bottom of the capsule 15; and (3) While the capsule 15 has no window and the outer frame 21 has no image display means, the capsule 15 has an image display means 56 directed toward the seat 16, at a position opposite to the entry port 51. As shown in FIG. 10, a portion of the one ring 19a of the inner frame 19 arranged outside the capsule 15 is curved upward so as to surround the top portion of the door 52 of the capsule 15 during a non-operating time of the amusement apparatus 50 of the second embodiment of the present invention, to form the curved portion 53, and a portion of the one ring 20a of the intermediate frame 20 arranged outside the inner frame 19 is curved downward so as to surround the bottom portion of the door 52 of the capsule 15 during the non-operating time of the apparatus 50, to form the curved portion 54. Therefore, when a player gets on the capsule 15 through the door 55 of the outer frame 21 and the door 52 of the capsule 15, the one ring 19a of the inner frame 19 and the one ring 20a of the intermediate frame 20 do not form an obstacle to the player's entrance.

The seat 16 is rotatably fitted to the bottom of the capsule 15 by means of the strut. The seat 16 is directed toward the door 52 of the capsule 15 when a player gets on the capsule 15, and after the player takes the seat 16, the seat 16 horizontally rotates by 180° as shown by the two-point chain line in FIG. 11. Therefore, even when the space in the capsule 15 is relatively tight, the player can easily take the seat 16 in the capsule 15.

The image display means 56 in the capsule 15 directed toward the seat 16 at a position opposite to the entry port 51 comprises a combination of a Braun tube, a liquid-crystal display board, a projector and a screen. This image display means 56 also displays the dynamic images of the universe or the sea bottom, as in the case of the image display means 32 in the amusement apparatus 14 of the above-mentioned first embodiment of the present invention.

Since the above-mentioned image display means 56 is provided in the capsule 15, it is not necessary to provide the capsule 15 with a window or to provide the outer frame 21 with a projector and a screen as in the amusement apparatus 14 of the above-mentioned first embodiment of the present invention.

Since the amusement apparatus 50 of the second embodiment of the present invention is used in the same manner as in the amusement apparatus 14 of the above-mentioned first embodiment of the present invention, a description of the method for using same is omitted.

According to the above description of the amusement apparatus 50 of the second embodiment of the present invention, the image display means 56 provided in the capsule 15 comprises the combination of the Braun tube, the liquid-crystal display board, the projector and the screen for displaying the dynamic images. However, the image display means 56 may be one which displays still pictures or still photographs.

Now, a third embodiment of the amusement apparatus having a rotary capsule of the present invention is described below with reference to FIG. 12.

Figure 12:
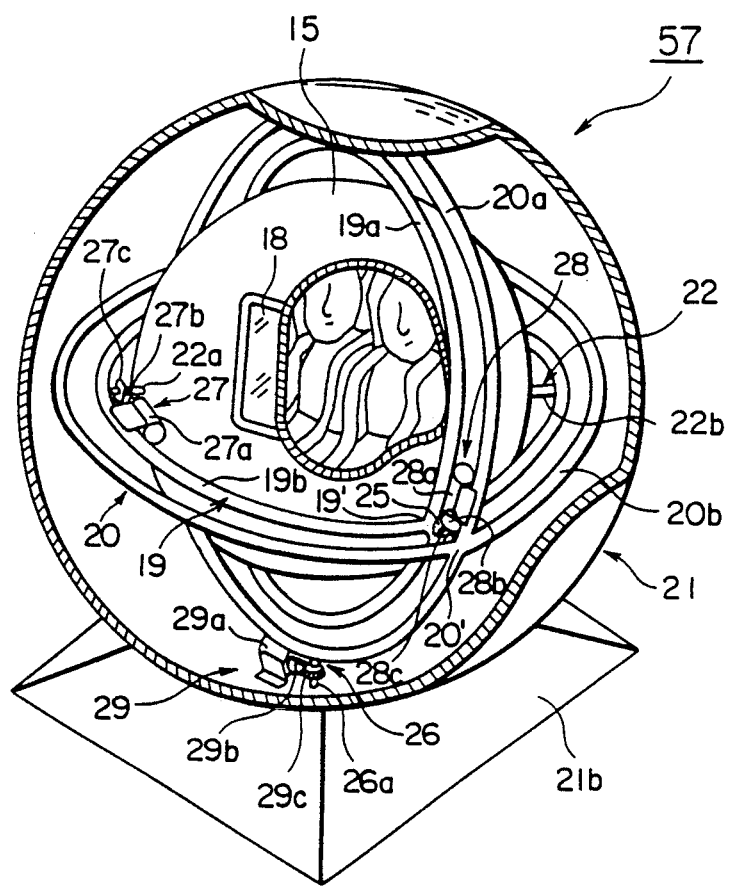
FIG. 12 is a partially cutaway schematic perspective view illustrating a third embodiment of the amusement apparatus having a rotary capsule of the present invention.

FIG. 12 is a partially cutaway schematic perspective view illustrating the third embodiment of the amusement apparatus having a rotary capsule of the present invention.

Since the amusement apparatus 57 of the third embodiment of the present invention is identical with the amusement apparatus 14 of the first embodiment of the present invention except that the third shaft 26 extends vertically, the same reference numerals are assigned to the corresponding components, and the description thereof is omitted.

Since the amusement apparatus 57 of the third embodiment of the present invention is used in the same manner as in the amusement apparatus 14 of the above-mentioned first embodiment of the present invention, a description of the method for using same is omitted.

Now, a fourth embodiment of the amusement apparatus having a rotary capsule of the present invention is described below with reference to FIG. 13.

Figure 13:
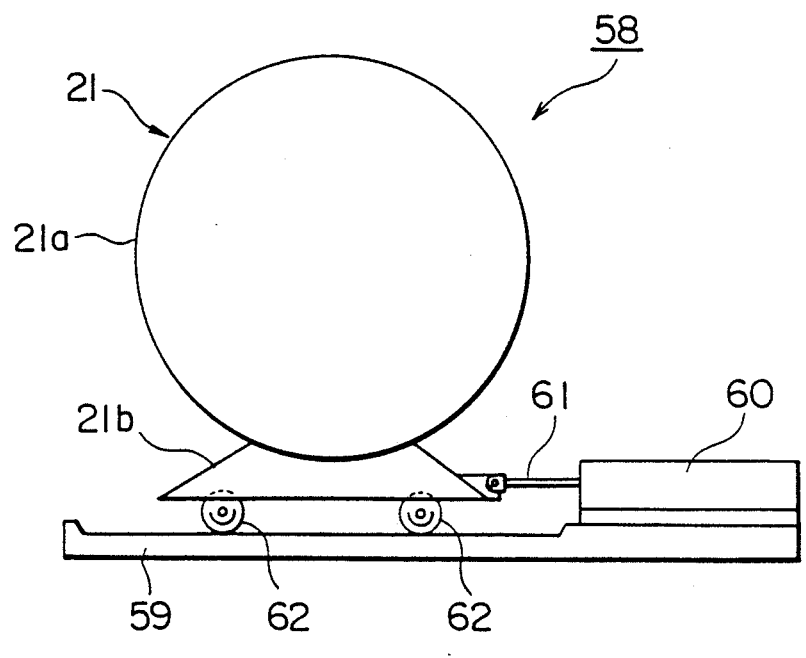
FIG. 13 is a schematic front view illustrating a fourth embodiment of the amusement apparatus having a rotary capsule of the present invention.

FIG. 13 is a schematic front view illustrating the fourth embodiment of the amusement apparatus having a rotary capsule of the present invention.

Since the amusement apparatus 58 of the fourth embodiment of the present invention is identical with the amusement apparatus 14 of the first embodiment of the present invention except that the pedestal 21b of the outer frame 21 is horizontally return-movable along a rail 59, the same reference numerals are assigned to the corresponding components, and the description thereof is omitted except for a means described later for causing the pedestal 21b of the outer frame 21 to return-travel horizontally along the rail 59.

In the amusement apparatus 58 of the fourth embodiment of the present invention, the pedestal 21b of the outer frame 21 is horizontally return-movable on the rail 59 by means of wheels 62 provided on a bottom portion of the pedestal 21b. A double-acting hydraulic cylinder 61 is provided at one end portion of the rail 59, and one end of a piston rod 61 of the hydraulic cylinder 60 is connected to the pedestal 21b.

A solenoid valve (not shown), provided in the hydraulic circuit of the hydraulic cylinder 60, for controlling driving of the hydraulic cylinder 60, is connected to the above-mentioned controller (not shown) for controlling driving of the capsule driving means 27, the inner frame driving means 28 and the intermediate frame driving means 29 in the amusement apparatus 14 of the first embodiment of the present invention. A prescribed program regarding driving of the hydraulic cylinder 60 is also inputted into this controller. Therefore, in the amusement apparatus 58 of the fourth embodiment of the present invention, the capsule driving means, the inner frame driving means and the intermediate frame driving means are independently and selectively driven in accordance with the prescribed program as in the amusement apparatus 14 of the above-mentioned first embodiment of the present invention, and in addition, the hydraulic cylinder 60 is also independently and selectively driven in accordance with the prescribed program.

In the amusement apparatus 58 of the fourth embodiment of the present invention, the capsule can be rotated in various directions at various rotating speeds relative to the ground as in the amusement apparatus 14 of the above-mentioned first embodiment of the present invention, and in addition, the capsule return-travels horizontally along with the rotation as mentioned above. It is therefore possible to give a player getting on the capsule a very special sensation.

According to the present invention, as described above in detail, it is possible to provide an amusement apparatus having a rotary capsule, of which the rotating direction of the capsule can be changed to an arbitrary direction from time to time, and further, the rotating speed of the capsule can be changed to an arbitrary speed from time to time, thus sufficiently satisfying a player who gets on the apparatus with an expectation of having a special sensation, thus providing industrially useful effects.

What is claimed is:

1. An amusement apparatus having a rotary capsule, which comprises:
    a capsule (15) having therein at least one seat (16), each provided with a player restraining means (17);
    an inner frame (19) arranged outside said capsule (15);
    an intermediate frame (20) arranged outside said inner frame (19);
    an outer frame (21) arranged outside said intermediate frame (20);
    a first shaft (22) for rotatably connecting said capsule (15) to said inner frame (19);
    a second shaft (25) extending in a direction different from that of said first shaft (22), for rotatably connecting said inner frame (19) to said intermediate frame (20);
    a third shaft (26) extending in a direction different from those of said first shaft (22) and said second shaft (25), for rotatably connecting said intermediate frame (20) to said outer frame (21);
    a capsule driving means (27), provided between said capsule (15) and said inner frame (19), for rotating said capsule (15) around said first shaft (22) relative to said inner frame (19);
    an inner frame driving means (28), provided between said inner frame (19) and said intermediate frame (20), for rotating said inner frame (19) around said second shaft (25) relative to said intermediate frame (20); and
    an intermediate frame driving means (29), provided between said intermediate frame (20) and said outer frame (21), for rotating said intermediate frame (20) around said third shaft (26) relative to said outer frame (21).

2. The amusement apparatus as claimed in claim 1, wherein:
    upon starting up said amusement apparatus, the center axes of said first shaft (22), said second shaft (25) and said third shaft (26) intersect each other at right angles at a point.

3. The amusement apparatus as claimed in claim 2, wherein:
    said third shaft (26) extends horizontally.

4. The amusement apparatus as claimed in claim 2, wherein:
    said third shaft (26) extends vertically.

5. The amusement apparatus as claimed in any one of claims 1 to 4, wherein:
    said capsule (15) is opaque and has a window (18) through which the outside can be viewed; and
    said outer frame (21) has an image display means (32) capable of being viewed from said at least one seat (16) through said window (18).

6. The amusement apparatus as claimed in claim 5, wherein:
    said image display means (32) displays a still picture or a still photograph.

7. The amusement apparatus as claimed in claim 5, wherein:
    said image display means (32) comprises a screen (32a) and at least one projector (32b) for projecting an image on said screen (32a).

8. The amusement apparatus as claimed in any one of claims 1 to 4, wherein:
    said capsule (15) has an image display means (56) directed toward said at least one seat (16).

9. The amusement apparatus as claimed in claim 8, wherein:
    said image display means (56) displays a still picture or a still photograph.

10. The amusement apparatus as claimed in claim 8, wherein:

said image display means (56) comprises a screen and a projector for projecting an image on said screen.

11. The amusement apparatus as claimed in any one of claims 1 to 4, wherein:

said outer frame (21) is return-movable along a rail (59).

12. The amusement apparatus as claimed in any one of claims 1 to 4, wherein:

said player restraining means (17) comprises:

a holder (33) provided movably between a player restraining position and a player releasing position, on each of said at least one seat (16);

a holder driving means for moving said holder (33) between said player restraining position and said player releasing position;

a holder locking/releasing means for locking said holder (33) at said player restraining position, and for releasing said holder (33) from said player restraining position;

at least one air bag (35a, 35b, 35c, 35d), attached to said holder (33), for pressing, when said holder (33) is at said player restraining position, a player sitting on said seat (16) against said seat (16);

a compressed-air supply pipe (36), one end of which is connected to said at least one air bag (35a, 35b, 35c, 35d), and the other end of which is connected to a compressed-air source (27);

a compressed-air discharge pipe (40), one end of which is connected to said at least one air bag (35a, 35b, 35c, 35d), and the other end of which is opened to the open air;

a compressed-air supply valve (41) provided in said compressed-air supply pipe (36), said compressed-air supply valve (41) being closed when said holder (33) is at said player releasing position, and being opened when said holder (33) is at said player restraining position; and a compressed-air discharge valve (44) provided in said compressed-air discharge pipe (40), said compressed-air discharge valve (44) being opened when said holder (33) is at said player releasing position, and being closed when said holder (33) is at said player restraining position.

13. The amusement apparatus as claimed in claim 12, wherein:

said compressed-air supply pipe (36) has a pressure control valve (45).

* * * * *